June 17, 1924.
W. L. DORR
FLEXIBLE SCRAPER
Filed July 9, 1923
1,498,155
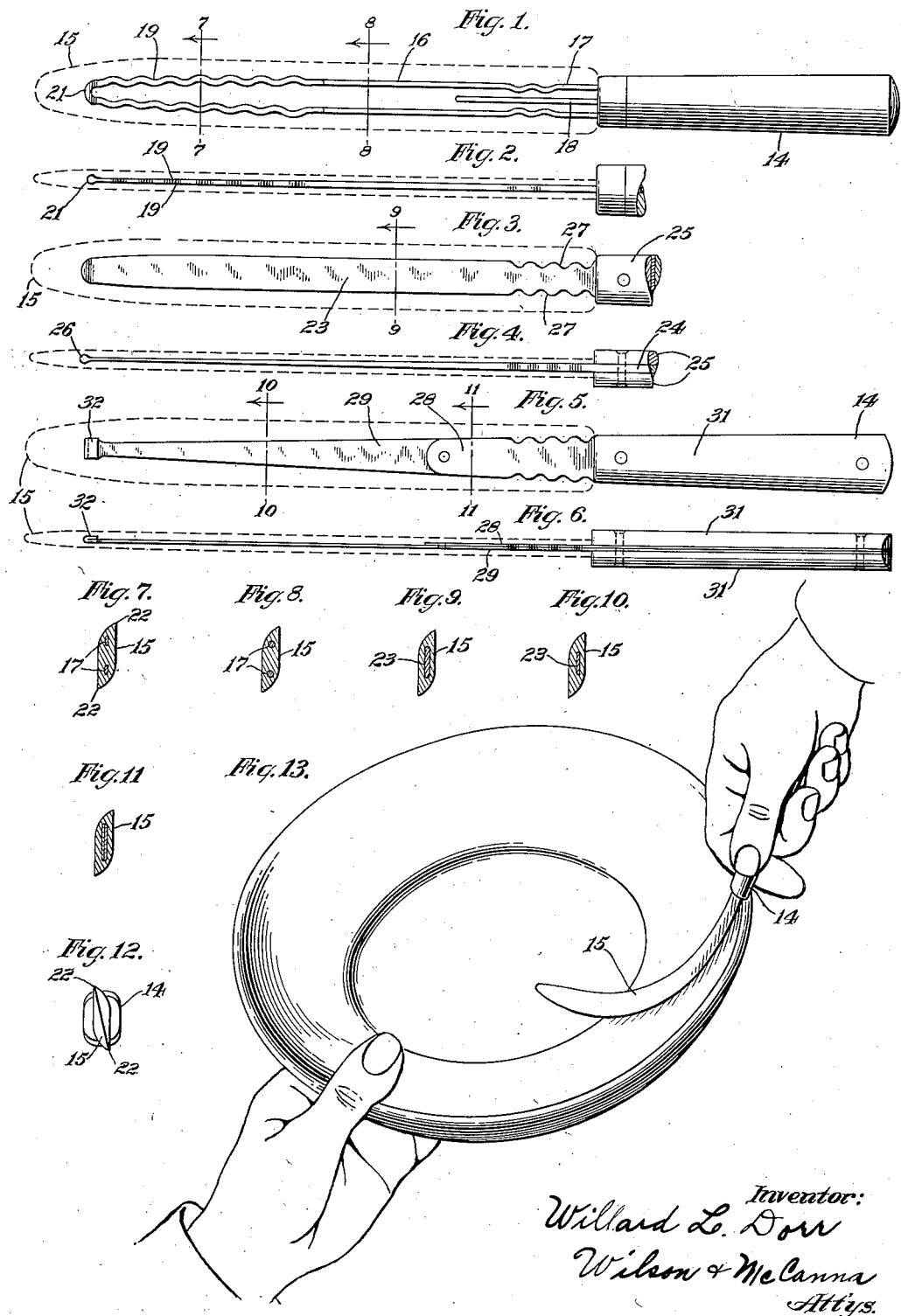
Inventor:
Willard L. Dorr
Wilson & McCanna
Attys.

Patented June 17, 1924.

1,498,155

UNITED STATES PATENT OFFICE.

WILLARD L. DORR, OF ROCKFORD, ILLINOIS.

FLEXIBLE SCRAPER.

Application filed July 9, 1923. Serial No. 650,344.

*To all whom it may concern:*

Be it known that I, WILLARD L. DORR, a citizen of the United States, residing at Rockford, in the county of Winnebago and State of Illinois, have invented certain new and useful Improvements in Flexible Scrapers, of which the following is a specification.

This invention relates in general to kitchen articles, and has more particular reference to scrapers.

The primary object of my invention is to provide a flexible scraper of novel construction, having a handle and a blade, the latter being preferably of rubber and reinforced by a flexible core, as will be more fully described hereinafter. This provides a sanitary construction, especially advantageous and desirable in removing food from pans and dishes with the view to saving and utilizing that which would otherwise become waste. The knife-like shape of the blade is, therefore, very well suited to this end, and by reason of its flexibility and rubber edges, it will conform to the shape of the particular pan or dish and permit easy removal of practically all of the food without mixing or breaking. The reinforcing core, preferably of spring metal shaped in any of various ways as will be described later, gives permanency of shape to the blade, thus making it more substantial and at the same time allowing the desired degree of flexibility for scraping curved and irregular surfaces. I have aimed to make the core more flexible at its outer end, since in practice I have found that a scraper of this kind is more effective and better adapted for various pans and dishes, especially for cleaning them, since the outer end portion of the blade may be readily conformed to the shape thereof and the inner end portion near the handle being more stiff and of a lesser degree of flexibility may be pressed with greater pressure against the dish. My invention, therefore, aims to provide a sanitary scraper which will promote economy in the kitchen by facilitating removal of food from pans and dishes, and which also may be used for cleaning purposes.

Another object is to provide a scraper of the character described constructed in such simple manner that it may be produced at a comparatively low cost.

Other objects and attendant advantages will be appreciated as the invention becomes better understood by reference to the following description when considered in connection with the accompanying drawings, in which—

Figures 1 and 2 are side and edge views respectively, of a scraper embodying my invention, showing the blade proper in dotted lines;

Figs. 3 and 4 are side and edge views respectively, of the scraper showing a modification of the core construction;

Figs. 5 and 6 are also side and edge views showing still another modification of the core construction;

Figs. 7 and 8 are cross-sections taken on the lines 7—7 and 8—8, respectively, of Fig. 1;

Fig. 9 is a cross-section taken on the line 9—9 of Fig. 3;

Figs. 10 and 11 are cross-sections taken on the lines 10—10 and 11—11, respectively, of Fig. 5;

Fig. 12 is an end view of the scraper looking at the blade end; and

Fig. 13 is a view illustrating the use of the scraper.

My invention contemplates the provision of a scraper characterized, generally stated, by a handle 14, a blade 15 of rubber or any other material or composition having a similar degree of flexibility and being sufficiently durable for practical purposes, and a flexible reinforcing core 16 embedded in the blade and attached to the handle.

The handle 14 may be of any suitable or preferred construction, and in the embodiment shown in Fig. 1, it is in one piece. The reinforcing core in this instance is formed of wire pieces 17 and 18 suitably secured in the handle. The wire piece 17, extended throughout substantially the entire length of the blade, is bent upon itself, providing two spaced portions between which the piece 18 is interposed at the handle end for the purpose of making this end stiffer and less flexible. The outer portion 19 of the wire piece 17 is flattened on its sides 19, tapering toward the outer end as shown plainly in Fig. 2, and leaving the terminus 21 unflattened, thereby forming a head. As a result of this construction, the core increases in degree of flexibility from a medial point toward the outer end and terminates in an enlarged head which prevents this end from piercing the rubber body. The wire piece 17 is crimped as plainly shown, for the purpose of more securely binding it to the rubber body in which it is embedded.

The blade or body 15 is cast onto the core and is preferably shaped to provide diagonally opposed edges 22 as plainly shown in the cross-sectional views and in the end views. By reason of this construction, the blade may be placed flat against a surface and moved there along with its edge directly bearing against and following the surface. It also allows a greater body of metal at the edge and causes less fatigue and wear on the edge proper than if the edge were located centrally. The blade while preferably of a suitable soft rubber composition, need not necessarily be made of this. If any other material or composition is employed, it should be flexible and durable to a degree comparable with a good grade of rubber.

In the modifications shown in Figs. 3 and 4, the reinforcing core is formed of a single piece of flexible steel, designated generally by 23, having a shank 24 secured between the two part handle sections 25. This core gradually tapers as to thickness from the handle to its outer end, leaving a head 26 for the same purpose as described above with reference to the wire core. This core may also be shaped along its side edges, as at 27, adjacent to the handle to provide insets for receiving the rubber body and thereby establishing a better union with the core.

In the modifications shown in Figs. 5 and 6, the core is built up of two strips 28 and 29 of flat spring steel or the equivalent, riveted together as shown, and secured between the parts 31 which make up a casing for the handle. The strip 28 reaches sufficiently beyond the handle to give the desired stiffness to the handle end of the blade, while the part 29 is tapered as to width toward its outer end and is turned over at such end, providing a head 32 similar to the heads 21 and 26 described above.

In each form of the invention shown the reinforcing core is wholly embedded in the blade body and is of a greater degree of flexibility at its outer end than at its handle end. The difference in degree is preferably gradual as results from gradually diminishing the cross-sectional dimension of the core. That the core may be formed in any of various ways is evident from the several modifications shown. In each instance, however, the characteristics are substantially the same. The rubber blade is more flexible at its edges than its central portion, so that the edges may readily conform to irregular surfaces being cleaned, and the outer end of the blade is more flexible than its inner end to likewise conform more readily lengthwise of the blade to the object being cleaned. In each instance, the reinforcing core is considerably stiffer in proximity to the handle so that greater pressure may be applied at this end if desired. In each case the rubber body fills in-sets in the reinforcing core and the tip of the core is enlarged to prevent it from breaking through the blade body.

It is believed that the foregoing conveys a clear understanding of the objects prefaced above, and it should be understood that in making scrapers embodying the principles disclosed herein, various changes might be made in materials employed and in the size and shape of the parts without departing from the spirit and scope of the invention as expressed in the appended claims.

I claim:

1. A scraper of the character described comprising a handle, a rubber blade, and a flexible reinforcing core embedded in the blade and increasing in degree of flexibility from a point near the handle to its outer end.

2. A scraper of the character described comprising a handle, a blade composed of pliable material, and a flexible metallic core embedded in the blade, the cross-sectional area of said core being gradually decreased from an inner point on the core substantially to the outer end thereof.

3. A scraper of the character described comprising a handle, a blade composed of pliable material, and a flexible metallic core embedded in the blade, said core being of comparatively flat material and terminating at its outer end in an enlargement embedded in the blade.

WILLARD L. DORR.